(12) United States Patent
Langton

(10) Patent No.: US 7,986,158 B2
(45) Date of Patent: Jul. 26, 2011

(54) METHODS, APPARATUSES, AND PRODUCTS FOR A SECURE CIRCUIT

(75) Inventor: Philip Sydney Langton, Santa Cruz, CA (US)

(73) Assignee: OFID Microdevices, Inc.

( * ) Notice: Subject to any disclaimer, the term of this patent is extended or adjusted under 35 U.S.C. 154(b) by 0 days.

(21) Appl. No.: 12/583,371

(22) Filed: Aug. 19, 2009

(65) Prior Publication Data

US 2010/0045337 A1    Feb. 25, 2010

Related U.S. Application Data

(60) Provisional application No. 61/189,642, filed on Aug. 21, 2008.

(51) Int. Cl.
    *H03K 19/00* (2006.01)
    *H04L 9/14* (2006.01)

(52) U.S. Cl. .......... 326/8; 326/39; 326/9; 257/686; 257/777; 713/189; 713/193

(58) Field of Classification Search .............. 326/38–41, 326/8–9; 257/686, 777; 438/109, 113; 713/189, 713/193
    See application file for complete search history.

(56) References Cited

U.S. PATENT DOCUMENTS

| 6,091,263 | A  * | 7/2000  | New et al. ............... 326/40 |
| 6,560,743 | B2 * | 5/2003  | Plants ................... 714/763 |
| 6,957,340 | B1 * | 10/2005 | Pang et al. .............. 713/189 |
| 7,034,387 | B2 * | 4/2006  | Karnezos ................ 257/686 |
| 7,117,372 | B1 * | 10/2006 | Trimberger et al. ....... 713/189 |
| 7,203,842 | B2 * | 4/2007  | Kean ................... 713/189 |
| 7,405,471 | B2 * | 7/2008  | Kledzik et al. .......... 257/686 |
| 2009/0230255 | A1 * | 9/2009 | Lemonovich et al. ...... 246/167 R |

* cited by examiner

*Primary Examiner* — Vibol Tan
(74) *Attorney, Agent, or Firm* — H. Black P.E.

(57) ABSTRACT

Methods, systems, apparatuses and products are disclosed for providing security circuits. Exemplary embodiments including semiconductor chips on circuit boards are shown, together with application in a movie stick/movie player pair. Such systems provide for and improve on the means for clocked logic security support beyond what is available in current security products while being capable of embodiment in low cost technologies such as programmable gate arrays.

9 Claims, 17 Drawing Sheets

400

Plan View

Side View

METHODS, APPARATUSES, AND PRODUCTS FOR A SECURE CIRCUIT

RELATED APPLICATIONS

This patent application claims priority to U.S. provisional patent application No. 61/189,642 Aug. 21, 2008 which is incorporated in its entirety by this reference. This patent application also claims priority to United States provisional patent application entitled METHODS, APPARATUSES, AND PRODUCTS FOR A SECURE CIRCUIT by inventor Philip Sydney Langton filed 6 Aug. 2009 and which is also incorporated in its entirety by this reference.

FIELD OF THE INVENTION

The present invention generally relates to devices for security which may be incorporated into personal computers, and devices sharing similar architectures, especially low-cost embedded systems, including but not limited to consumer and/or widely-provided customer service devices. More particularly, the invention relates to an architecture, a design and implementation techniques for a circuit for providing security features.

BACKGROUND OF THE INVENTION

SOTOP (Single Secure On-time Only Programmable) and SCSM (Single Circuit Secure Memory) are closely related circuits. Either or both may be used to create security devices with uncommon architectures that can provide for consumable keys (one-time keys as a limiting case, perpetual keys as the opposite) and high security. Such security devices are based on simplicity favored over ever-growing complexity. A hardware/microcode/firmware approach is used.

Extremely high security is possible at great (often unaffordable) cost using conventional software-based implementations as an alternative to the invention. Secure microprocessors have been abandoned in many applications such as cellphones—not for reason that their security is unneeded, but rather because their cost is prohibitive.

In any case, whether using previously developed solutions or the invention, adding a secure module to an insecure assembly will not automatically make the assembly secure. Rather a secure module merely provides the opportunity to design and build a secure assembly. Because the invention focuses on lowest cost rather than highest possible security it opens the door to low cost assemblies since, not only is the incorporated security module itself cheap but the cost of assembly features to accommodate it are low cost also.

One problem of using highly innovative solutions to meet commercial needs for superior security/cost tradeoffs is that because of the out-of-the-mainstream approach used unusual components have been needed and this augurs against very low cost until and unless extremely high volumes justify an ASIC (application-specific integrated circuit). Embodiments of the invention address that problem, and more.

SUMMARY OF THE INVENTION

The disclosed invention includes, among other things, a manufacture comprising two clocked logic subsystems each including a PGA (programmable gate array) circuit, a configurator circuit, a configuration memory and an input circuit coupled to write to the configuration memory. The input circuit of each subsystem is operable to write to the configuration memory of the other when it is unclocked.

According to other aspects of the present invention, a SOTOP and/or a SCSM may be included and functional.

According to another aspect of the present invention, two closely coupled FPGAs may be bonded to a single substrate.

In an embodiment of still another aspect of the present invention, a secure movie stick and player may be provided.

An advantage provided by the present invention is that it provides for a low cost and complexity with an excellent level of cost-effectiveness concurrent with data that is retained in a non-volatile memory in which the data may be created and stored during operation, while providing that in the event of an attack by eavesdropping then any cracking can be made short-lived and unprofitable.

Other solutions may provide just some of the above, or all of the above but only when connected to a trusted server. Any requirement for the use of a trusted server may be a disadvantage or even infeasible.

BRIEF DESCRIPTION OF THE DRAWINGS

The aforementioned and related advantages and features of the present invention will become better understood and appreciated upon review of the following detailed description of the invention, taken in conjunction with the following drawings, which are incorporated in and constitute a part of the specification, illustrate an embodiment of the invention and in which.

For convenience in description, identical components may have been given the same reference numbers in the various drawings.

DETAILED DESCRIPTION OF THE INVENTION

The description of well-known components is not included within this description so as not to obscure the disclosure or take away or otherwise reduce the novelty of the present invention and the main benefits provided thereby. An exemplary embodiment of the present invention will now be described with reference to the Figures.

Figure 1:
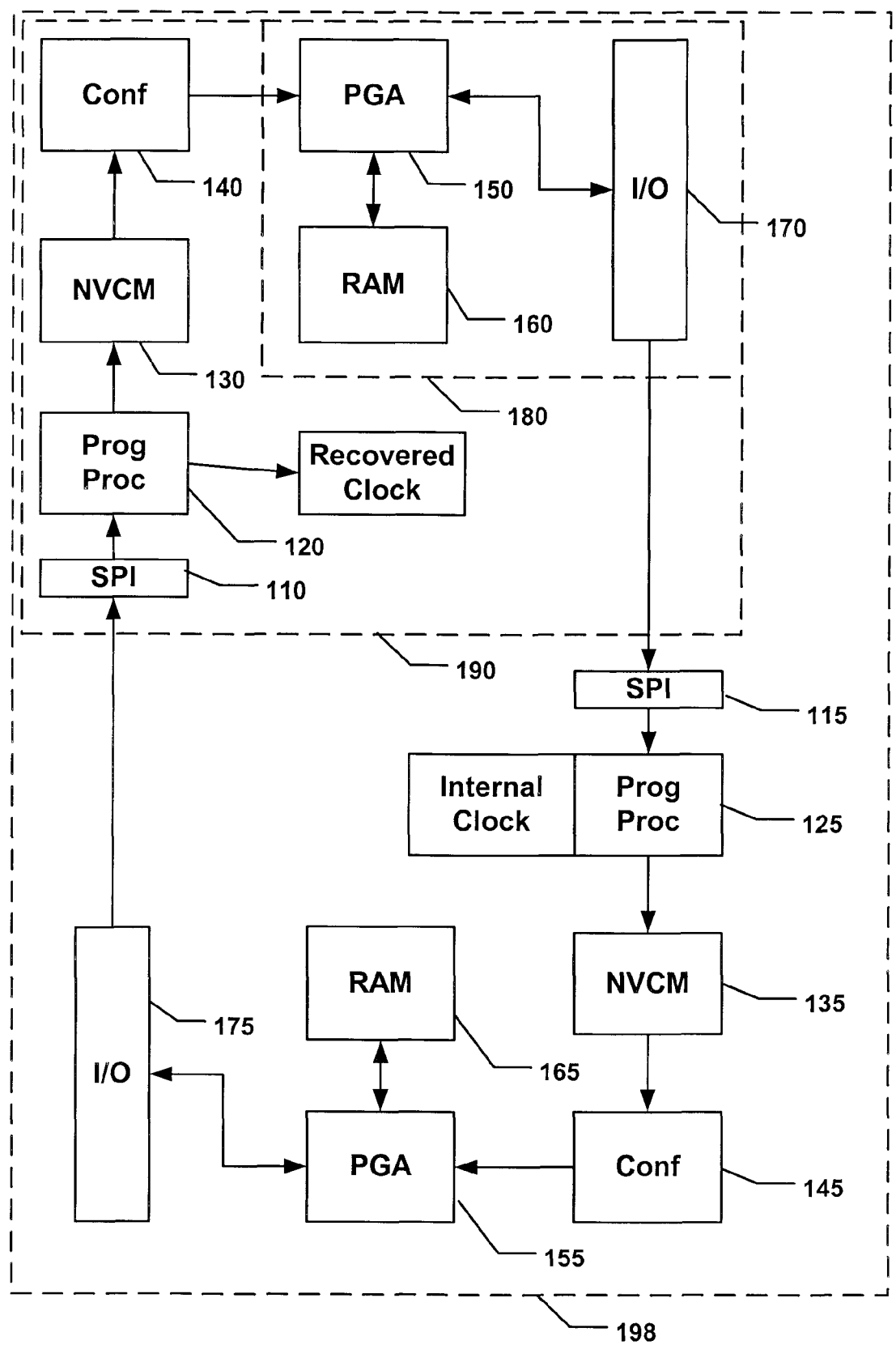
FIG. 1 shows an exemplary assembly configured according to an embodiment of the invention.

Refer to FIG. 1 which shows an exemplary assembly configured according to an embodiment of the invention. A PGA (programmable gate array) 150 is present. Commonly termed an FPGA (field programmable gate array), such devices are well-known in the art, however commercial FPGA products tend to incorporate further subsystems, including some of those described herein (below), and other subsystems.

PGA may be endowed with a RAM 160 (Random Access Memory), usually on the same substrate. In some implementations RAM 160 may be an integral part of PGA 150 implemented typically in a bistable circuit, for example a D-type flip-flop.

PGA is also coupled to an I/O (Input/Output) block 170 which can provide connection off-chip (present but not shown in FIG. 1).

In embodiments, Configurator 140 may read from NVCM 130 (Non-volatile configuration memory) at chip power-on initialization so as to responsively configure PGA 150 steered by the contents of the NVCM 130 and, optionally, initialize the data represented in some or all of RAM 160.

In some embodiments PGA 150, RAM 160 and I/O block 170 may substantially occupy a single chip substrate 180. In this case Configurator 140, Configuration memory (for example NVCM 130) and other parts are external—this is sometimes termed a "two-chip solution" even though more than two chips may be used.

In more modern embodiments more subsystems may be included in a single chip. In a preferred embodiment of the invention the entire set of subsystems shown in FIG. 1 (and optionally more) is included as a single chip 198.

Still referring to FIG. 1, Program Processor 120 is typically a state machine that uses clocked logic to write to the NVCM at a time that the PGA logic is not running. That is to say when the main system clock (not shown in FIG. 1) is stopped. Program Processor 120 may have some form of internal clocking but more typically recovers a clock signal from SPI (Serial Programming Interface) 110. Program Processor 120 does much more than recover the clock however, it is the means by which information enters NVCM 130 to crucially control PGA 150 and initialize RAM 160 from power-on reset. The use of a serial interface for programming is a convenience but is not essential to the invention; any of many various types of input may be used to good effect.

In an embodiment, the set of components may be formed onto a single "FPGA known good die" 190, thus providing a part that may be, for example, wire-bonded or solder beaded and encapsulated as is, or formed into a larger assembly.

Information may enter Program Processor 120 in at least two ways. Firstly, the logic controls that are later used to initialize the PGA 150 may be formed when the chip is one-time configured, this may considered a late part of the manufacturing process. PGA initialization takes place when the system clock is unfrozen, or upon power-up if the clock is never frozen at any time that the power is turned on.

PGA 150 may be set up with the logic for embodying a CPU (Central Processor Unit, especially a RISC (Reduced Instruction Set Computer) processor) in the Programmable Gate Array 150 and RAM 160 may also be set up with firmware to then control the RISC CPU formed in the PGA 150. Implementing a RISC CPU in this way allows a higher level of program abstraction as contrasted with the flip-flops, latches, LUT (lookup table) level and similar features inherent in typical PGA capabilities. This early operation of Program Processor 120 is described further below in connection with FIG. 2.

A second type of operation of SPI 110 with Program Processor 120 is that it may be driven from I/O block 175 from the lower half of the system depicted in FIG. 1. As may be apparent SPI 115, Program Processor 125, NVCM 135, Configurator 145, PGA 155, RAM 165 and I/O block 175 form an entire, substantially symmetrical sub-system to that described above as ref.190. It is a security feature of commercial FPGA parts that reading from the NVCM is not allowed except by the Configurator, which, by design, does not allow readout such as for design cloning which may be illegitimate if unauthorized.

The clock may thus be stopped on one PGA (150 or 155) while an NVCM (135 or 130 respectively) is being written to. For example, PGA 150 may cause RISC code to be executed that performs I/O to stop the clock on PGA 155 and also writes into SPI 115. Then, later it may be the turn of PGA 150 to stop the clock on PGA 150 and write into SPI 110.

Moreover, it will be apparent to a person of ordinary skill in the art who is familiar with SOTOP circuits described in the prior art that a SCSM can be built with such an arrangement.

Figure 2:
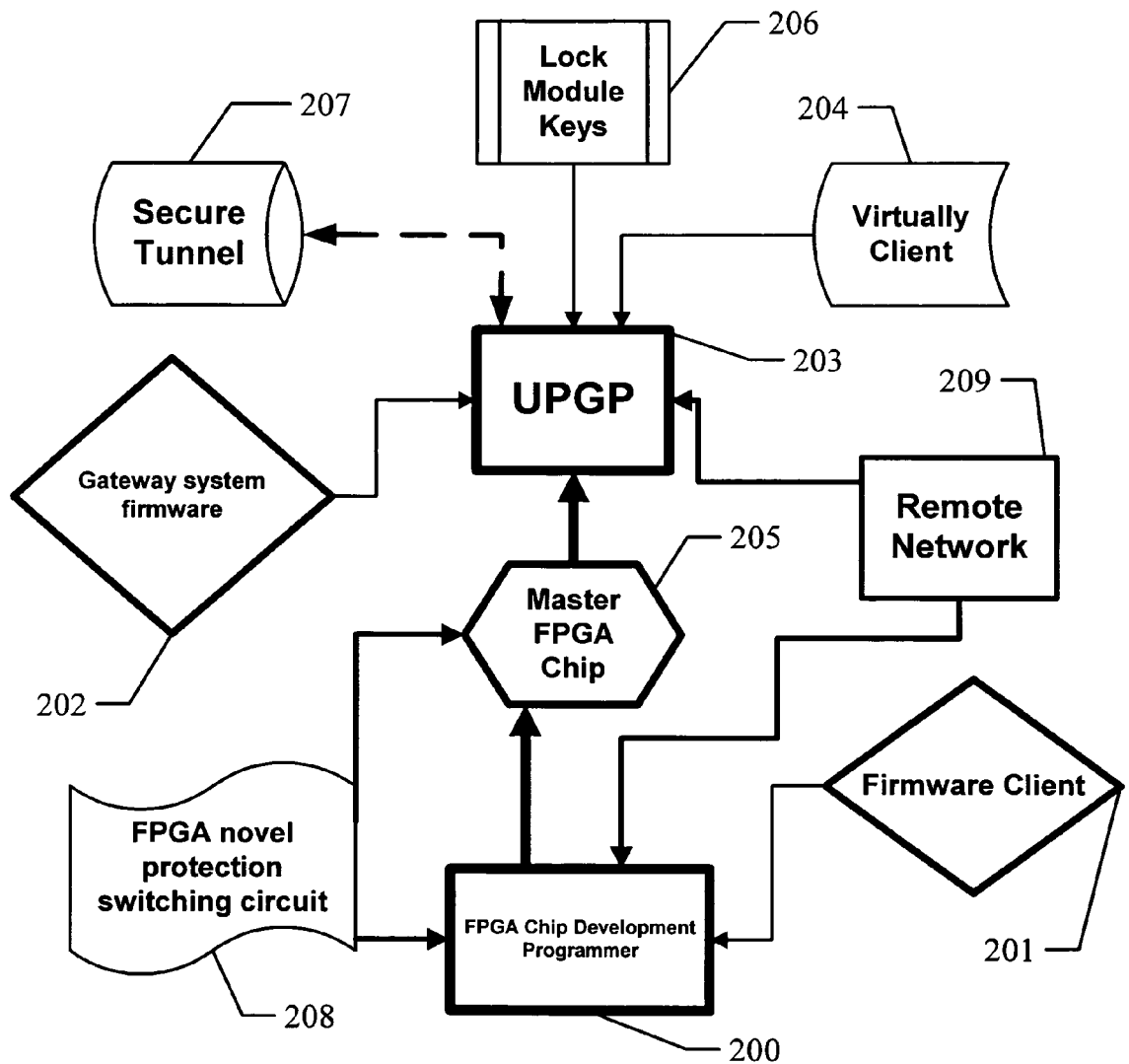
FIG. 2 is a block diagram that shows an architectural structure an approach to PGA component initialization according to an embodiment of the invention.

FIG. 2 is a block diagram that shows an architectural structure an approach to PGA (Programmable Gate Array) component initialization according to an embodiment of the invention.

There are a number of ways for a client to introduce their own initialization data into an FPGA (Field Programmable Gate Array) production run, all of which are known industry standards. In the first instance of an industrially known standard, the clients may build their own proprietary client-side firmware directly into the FPGA Chip Development Programmer 200 fabric. This allows the clients to store and retrieved their own dynamic IP (intellectual property) keys, and the client later may do a final lockdown into NVCM (non-volatile configuration memory).

In the second instance of an industrially known standard, the client and/or clients may provide their own proprietary software's Firmware, or a Firmware Client 201, and/or hardware security to firewall off critical information within the manufacturing environment.

In the third instance of an industrially known standard, the client may embed FPGA Gateway System Firmware 202 obtained from an outside vendor into a UPGP (Universal Production Gang Programmer) 203, or directly into the FPGA.

In the fourth instance of an industrially known standard, a Client may Virtually 204 input their own data into a production run of manufactured FPGAs by using a UPGP 203 to store and retrieved their own file system via a Master FPGA 205 key embedded directly into the UPGP 203.

In the fifth instance of an industrially known standard, the client may use Initialize Lock Module Keys 206 to establish a Secure Tunnel 207 into the UPGP 203 to pre-authenticate end users.

In the sixth instance of an industrially known standard, the client may insert a Novel Protection Switching circuit 208 into the FPGA design itself. In the final instance of an industrially known standard, the client may use a Secure Remote Network 209 to transmit their firmware to the manufacturer of the FPGA.

Figure 3A:
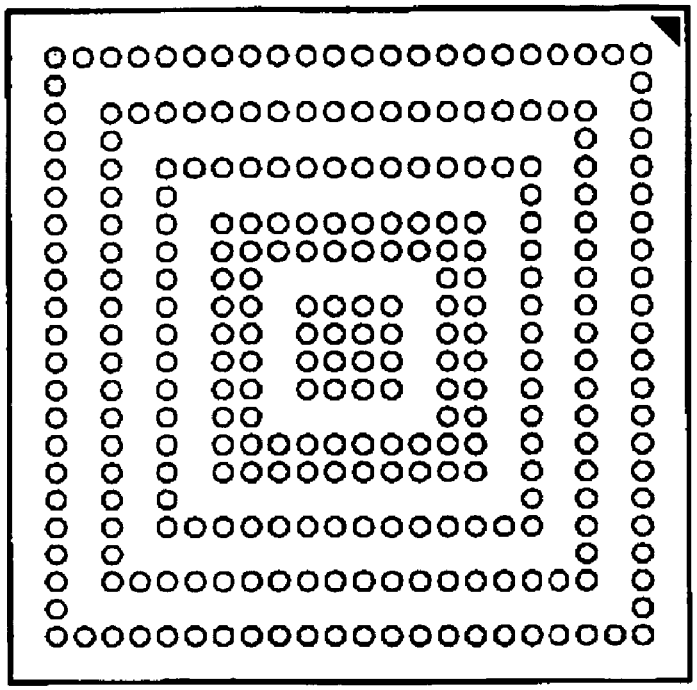
FIGS. 3A and 3B show plan and side views of a PGA package as used in forming part of an assembly configured according to an embodiment of the invention.
Figure 3B:
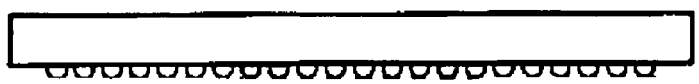

FIGS. 3A and 3B show plan and side views of a PGA package as used in forming part of an assembly configured according to an embodiment of the invention. FIG. 3A shows a plan view of the solder-ball side of an FPGA that may be used. In this example the chip is 12 mm by 12 mm and has a total of 284 solder balls each at 0.5 mm ball pitch. This is a chip-scale ball grid array. FIG. 3B shows the same chip in profile or side view, a single row of 22 balls is visible close to one edge. FPGA components are available in many types of packages, the use of a BGA (ball grid array or ball grid package) is merely exemplary and enabling, but not critical. Other types of packages, variously mounted, may be used within the general scope of the invention.

Figure 4:
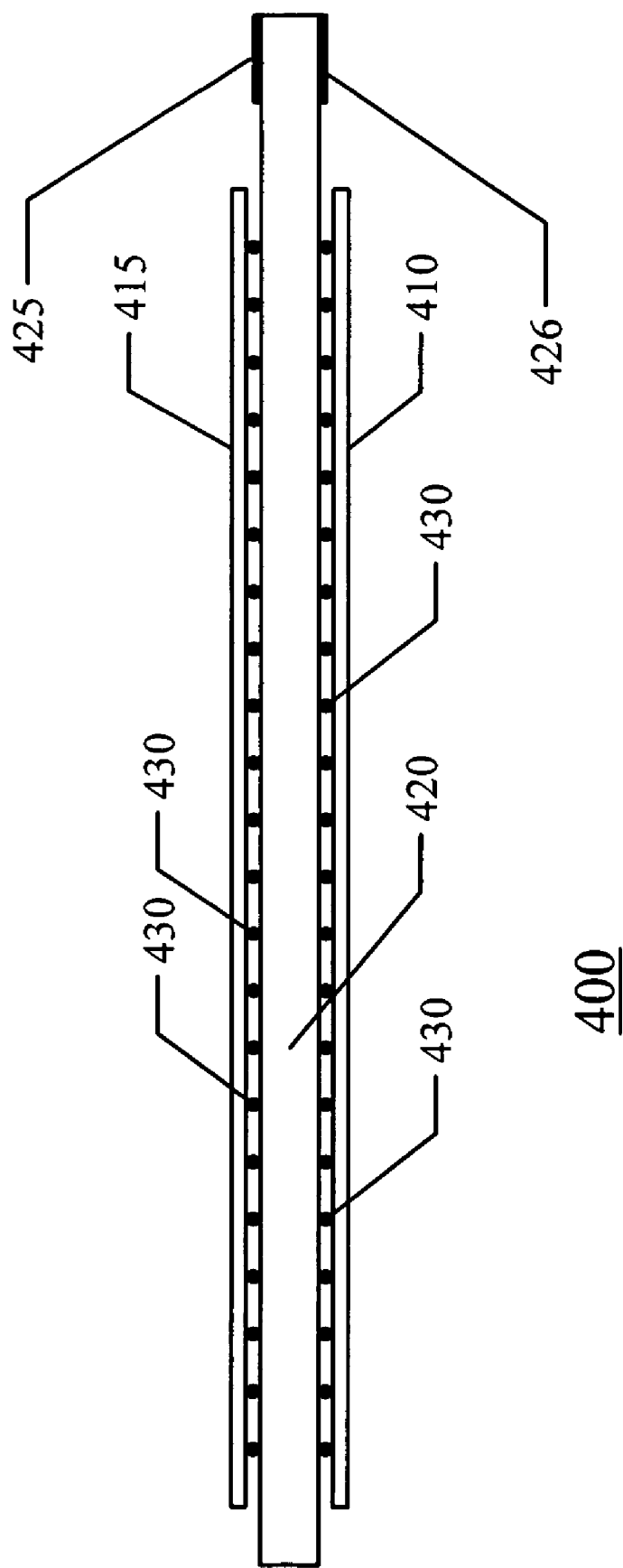
FIG. 4 shows an assembly 400 in side view according to an embodiment of the invention.

FIG. 4 shows an assembly 400 in side view according to an embodiment of the invention. FPGAs 410 and 415 may be of the same type as the FPGA described earlier (ref. 190 in FIG. 1, also FIG. 3A and FIG. 3B).

Referring again to FIG. 4, FPGAs 410 and 415 may be bonded by solder balls 430 to a double-sided substrate 420 (typically of fiber glass resin or similar insulating material with conductors buried therein). Copper fingers 425, 426 may be provided for off-assembly connection.

In such an assembly much of the interconnection is hidden within substrate 420 and between the two FPGAs 410, 415. Moreover ball-grid chips are difficult to disassemble without destroying the assembly, the components parts, or at the very least making the intrusion tamper-evident. Whilst every system is ultimately hackable the construction of an embodiment such as this is well beyond the capabilities of a home handyman to breach. This fits well with the philosophy of OFID products generally—that highly cost effective security is provided cheaply, but the most extreme security at almost any price is something outside the scope of OFID products.

The effect of combining two commonly available two circuit memory chips and tightly coupling them where each can, in turn, take full control of the other (but only one at a time) allows a specialized SCSM device or a SOTOP device to be built by closing off general purpose access from the outside and yet allowing data to, in effect, circulate in a loop between the two subsystems.

Where still more security is required it is feasible, where economic concerns permit, to implement using known good die FPGAs in place of ball grid packaged FPGAs. Two adjacent known good dice can be interconnected on a single chip (in effect a double-sized die). However, unless volumes are high this additional security is bought at increased cost, which is against the most optimal use of the invention.

Off-assembly communication with the outside world and the application of consumable memory security devices is well-known though novel and valuable techniques can be further refined based on the hardware/microcode/firmware based assemblies described above.

Using manufactures based on the circuits described above, a large variety of products are enabled. Optimally, but not essentially, such products would have a number of requirements. A first and primary requirement is low cost and hence—complexity, especially as may be reflected in the cost and number of components called for. The invention may find application not where the highest possible security is required but where only a low cost is afforded but nonetheless an excellent level of cost-effectiveness is sought in the security that is, in fact, provided. A second advantage of the inventive circuit is energy performance, notably that data is retained in a non-volatile way even when no measurable amount of power is used. Portable consumer-grade primary cell powered devices come to mind. A third advantage is that data (in the broadest sense) may be created and stored during operation; some alternative solutions are based on a once-and-for-all-time locking up of information at the manufacturing or distribution stage.

A fifth advantage of the security aspects circuit is that if it is attacked by eavesdropping (or a substantially similar man-in-the-middle type of attack) then any cracking can be made short-lived and unprofitable. This arises out of an ability for the supplier/distributor to control the revoking or expiry of security keys. The user cannot stimulate the device to revoke some of its keys on the road to cracking the remainder of them.

Finally, other solutions may provide all of the above—but only when connected to a trusted server. In effect the use of a trusted server extends the reach of the total security system. While that approach can be wholly satisfactory in some implementations it is vulnerable to attack of the central area of control, which is likely to result in a high cost for protecting it from attack. Moreover sometimes adequate (as contrasted with excellent) security is desired even when connection (via Internet or otherwise) to a trusted system such as a remote server is infeasible.

Figure 5:
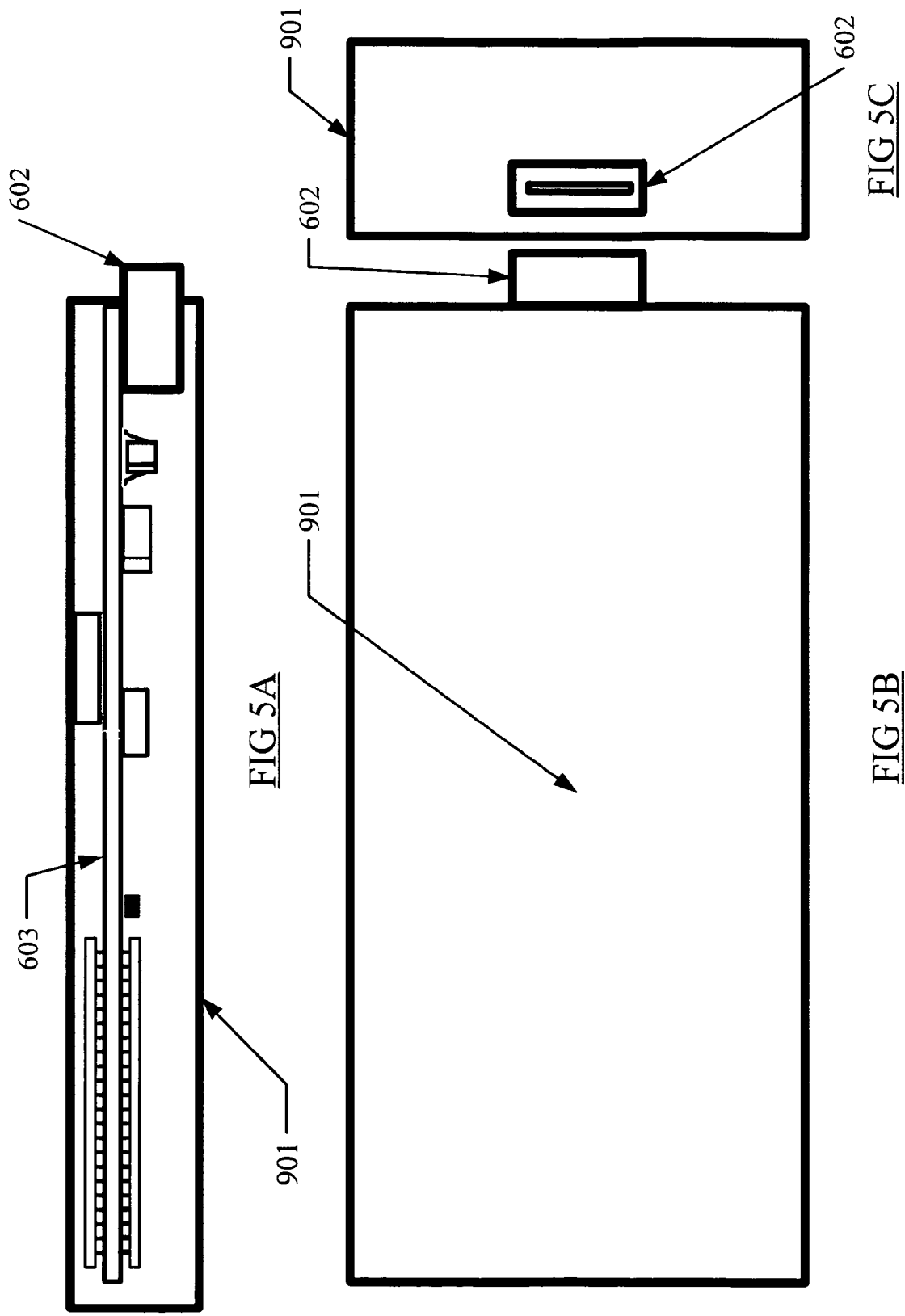
FIG. 5A, 5B, 5C respectively show side, bottom and top views of an exemplary embodiment of the present invention.

FIG. 5A, 5B, 5C respectively show side, bottom and top views of an exemplary embodiment of the present invention. Into plastic housing 901 the PCBA 603 (printed circuit board assembly) may be placed. Plastic housing 901 may act to protect the PCBA and the USB connector 602. The sealing of plastic housings are known industry standards.

Figure 6:
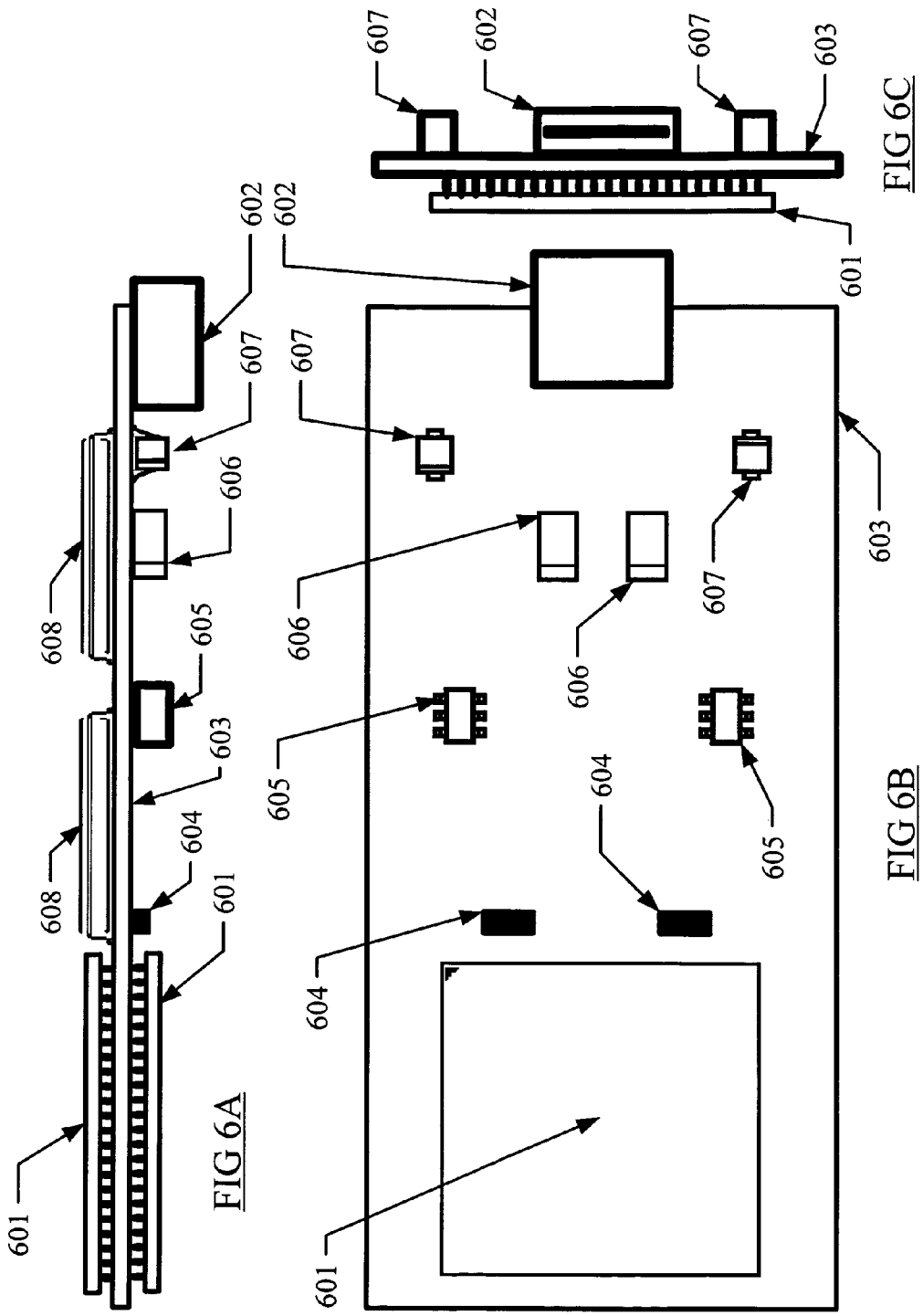
FIG. 6A, 6B, 6C show side, bottom and top views of a Flash Movie Stick mass storage device according to an exemplary embodiment of the present invention.

FIG. 6A, 6B, 6C show side, bottom and top views of a Flash Movie Stick mass storage device with a PCBA 603 with SMT (Surface-mount technology) components according to an embodiment of the invention. SMT parts include BGA (Ball-Grid Array) package 601, this may include SMDs (Surface-mount devices), FPGAs (field-programmable gate arrays), and ASICs (application-specific integrated circuits) all of which are known industry standards. USB (Universal Serial Bus) type A Connector 602, and/or other SMD connectors that are known industry standards including USB-A USB-B, Mini-B, Micro-AB and Micro-B. NS: non-standard connectors also exist for specific proprietary purposes, and not are interoperable with USB-IF (USB Implementers Forum) compliant equipment. Printed circuit board, or PCBA 603 is used to mechanically support and electrically connect electronic components using conductive pathways, or traces, etched from copper sheets laminated onto a non-conductive substrate. Capacitors 604 may be a SMD or two-terminal through-hole passive electronic component consisting of a pair of conductors separated by a dielectric. Several solid dielectrics are available, including paper, plastic, glass, mica and ceramic materials that are known industry standards. Resistor 605 may be a two-terminal through-hole, SMD electronic or one or more Array SMD components. Tantalum capacitors 606 may be SMD, and/or through-hole tantalum forms of electrolytic capacitor. Diodes 607 may be SMD or two-terminal device.

FIG. 6A shows a side view of a TOSP (Thin small-outline package) Flash memory 608 which is a non-volatile computer memory that can be electrically erased and reprogrammed. There are a variety of small form-factor IC (integrated circuit) carriers other than TSOP, for example BGA (Ball-Grid Arrays) package, SOIC (Small-outline integrated circuit), PSOP (Plastic small-outline package), SSOP (Shrink small-outline package), and TSSOP (Thin-shrink small outline package).

Figure 7:
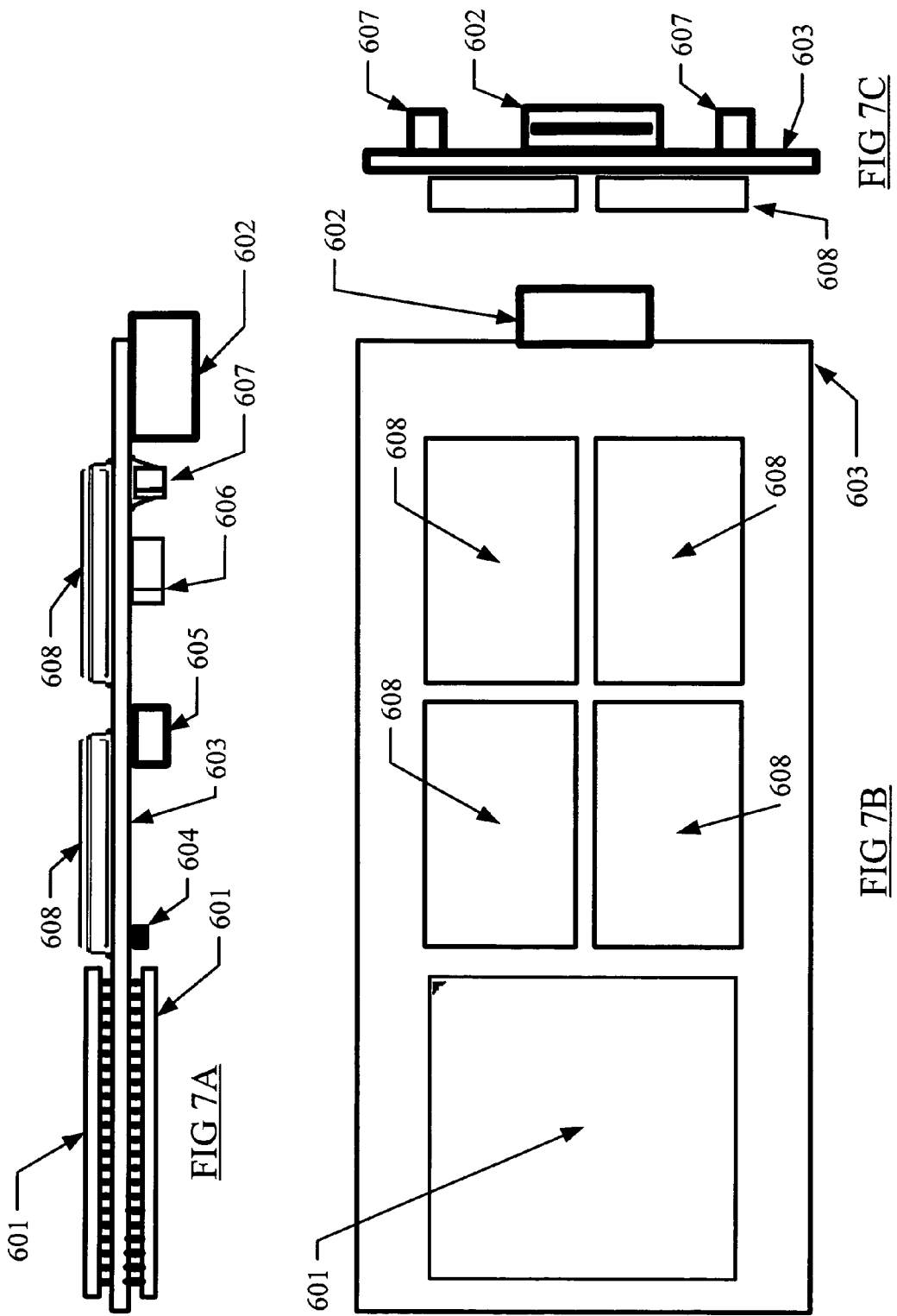
FIG. 7A, 7B, 7C show three views (side, bottom and top) of a Flash Movie Stick mass storage device according to an embodiment of the invention.

FIGS. 7A, 7B, 7C show three views of a Flash Movie Stick mass storage device views assembly PCBA with SMT configuration according to an embodiment of the invention. Flash memories 608 in the FIG. 7B top view shows four non-volatile computer memory chips 608 that can be electrically erased and reprogrammed. TOSP is shown but not critical, other formats may be used. In FIG. 7C, the Flash memory bottom view, there is a non-volatile computer memory 608

Figure 8:
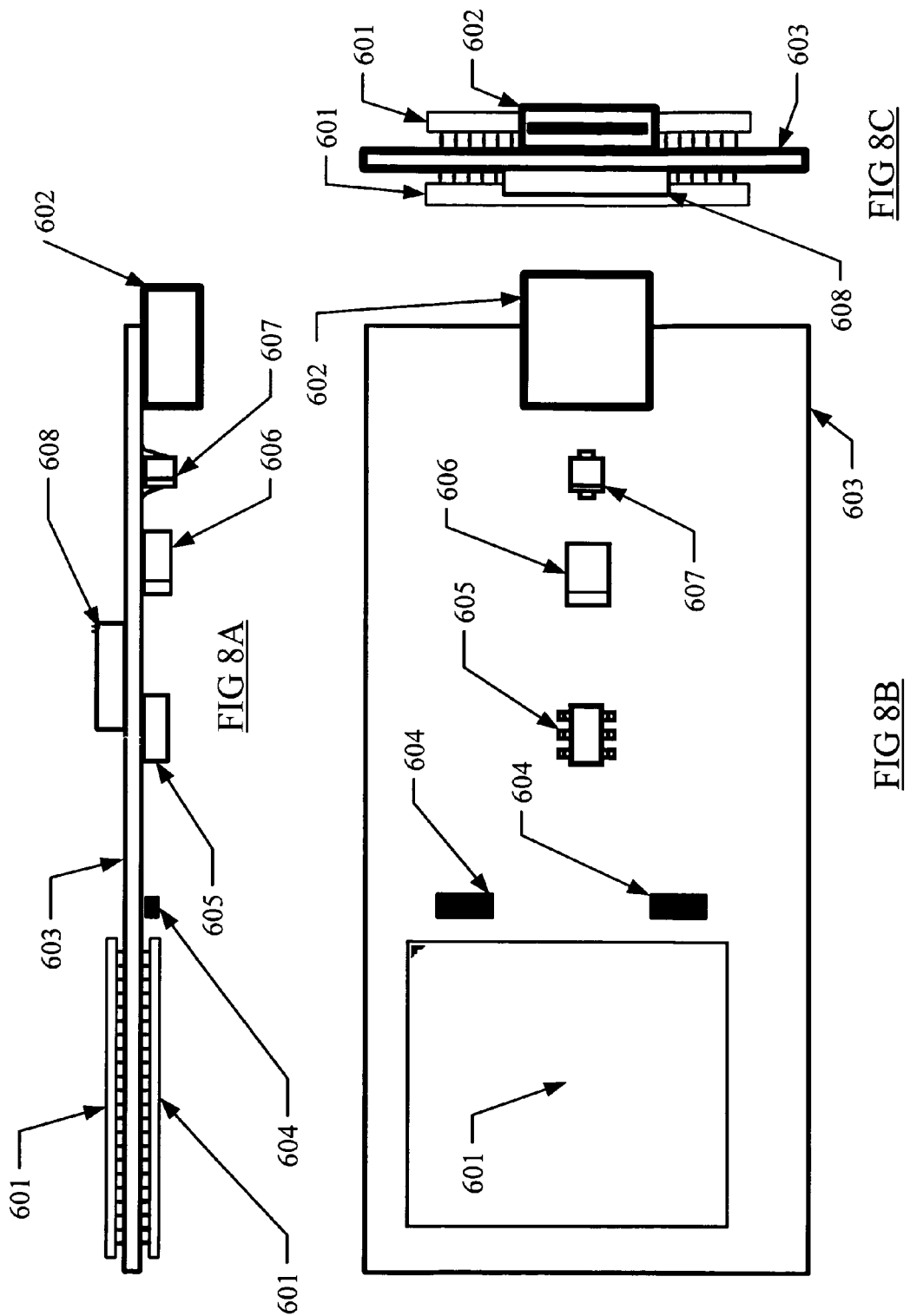
FIGS. 8A, 8B, 8C and FIG. 9 show four views of a token device assembly according to an embodiment of the invention.

FIGS. 8A, 8B, 8C show three views of a token device assembly and there are at least two classes of meaning of token in computing: The views show PCBA 603 and an SMT configuration. FIG. 8B top view shows FPGA 601.

Figure 9:
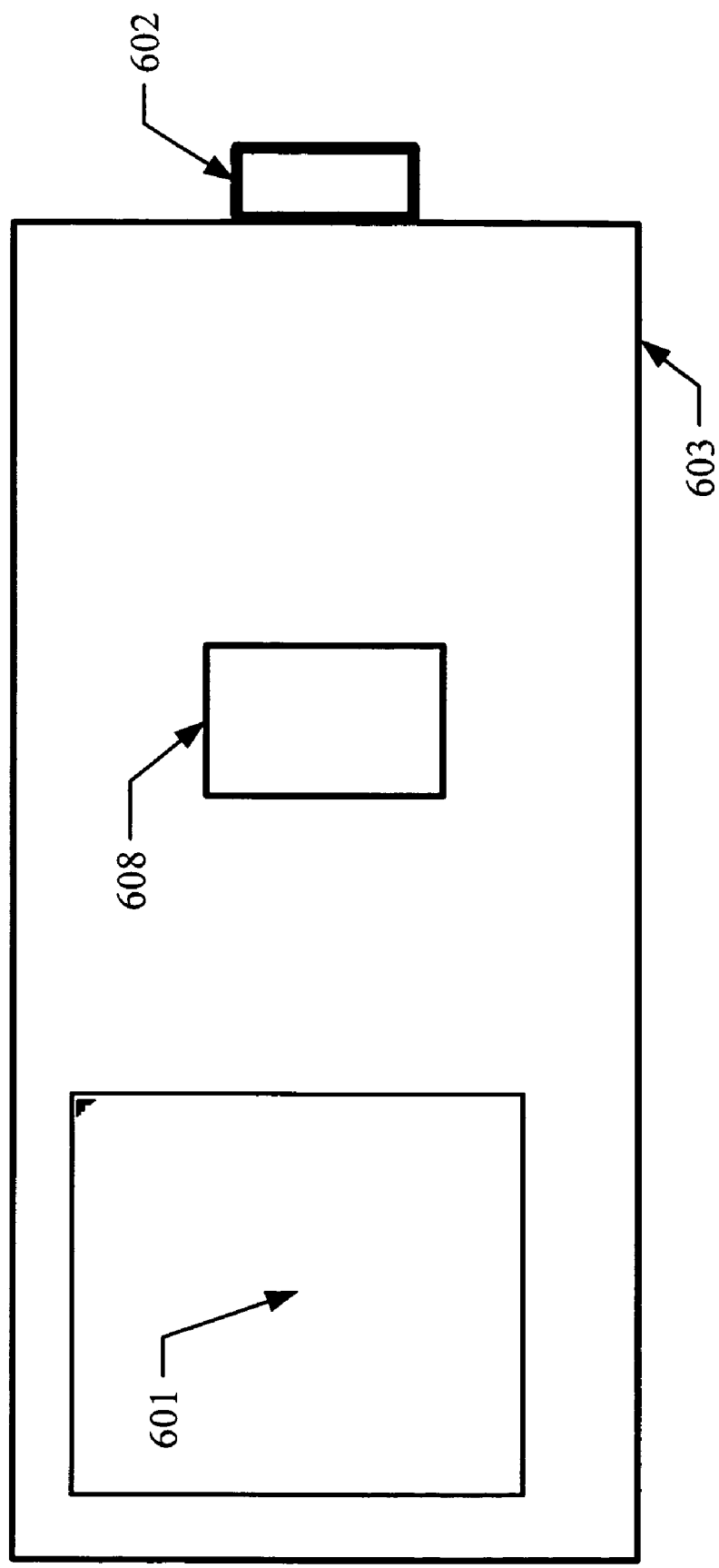

FIG. 9 shows a bottom view of the token device of FIGS. 8A, 8B, 8C with a small memory secondary storage 608 which may be a secure or insecure Flash memory.

Figure 10:
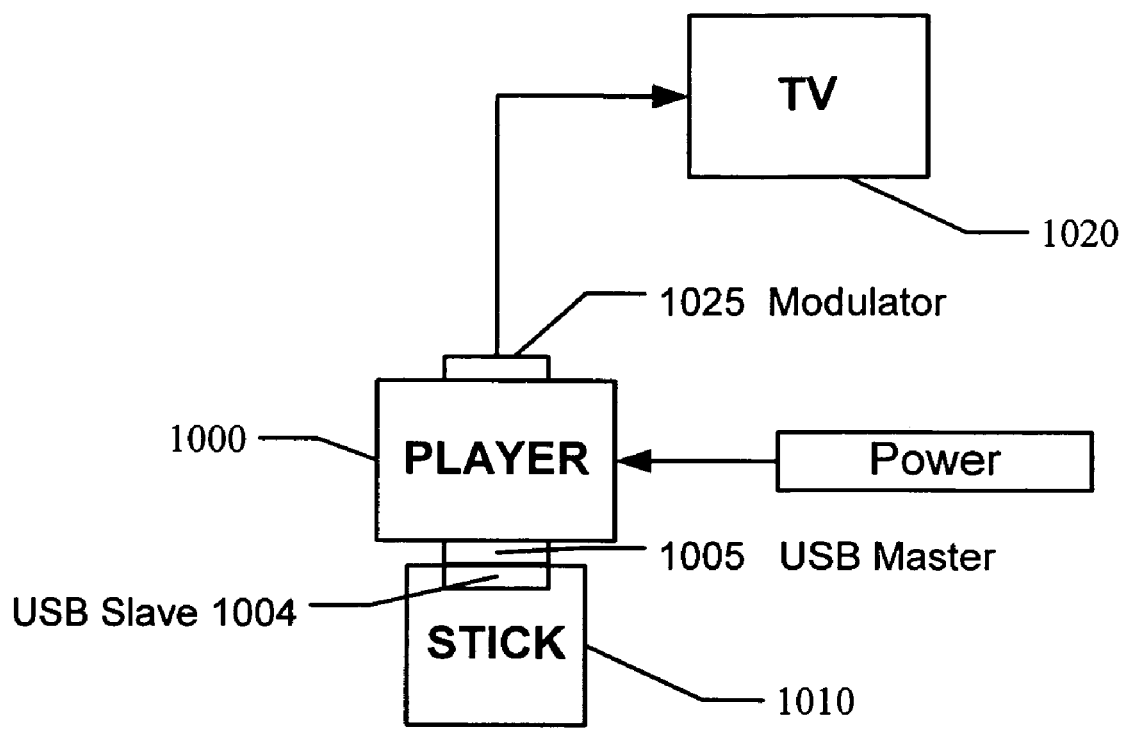
FIG. 10 shows a movie stick and player connected to a television according to an embodiment of the invention.

FIG. 10 show an exemplary system that exploits the advantages described above. It particularly illustrates a technique for key revocation. It should be realized however that this is but an example to illustrate capabilities and is not a limiting application of the invention.

Referring to FIG. 10, more specifically it shows a so-called movie stick and player connected to a television according to an embodiment of the invention. A STICK 1010 contains content such (for example) as a movie recorded in a Flash memory technology. The STICK 1010 contains a microprocessor-based, single-secure memory circuit with SOTOP. It is powered and communicates only via the USB slave port. Use of USB slave 1004 is exemplary, not limiting. The STICK 1010 also encodes in SOTOP multiple arrays of keys, described with reference to other figures, below.

Keys may typically be 32 bit random numbers used as one-time secret keys. 32 bits is sufficient to ensure that a brute force attack will be ineffective if each wrong guess is penalized with a significant delay. The type of key used is not critical.

Still referring to FIG. 10, a PLAYER 1000 is externally powered and provides a USB Master port 1005 onto which the STICK 1010 is attached. Again USB is exemplary only. In this case the Player incorporates a modulator 1025 to generate a suitable signal for a TV (television) 1020. A stream of data encoding the movie is received from the STICK 1000 by the PLAYER 1010 and modulated for the TV 1020.

The movie may be stored in the clear or encrypted. If encrypted, then the stream must be decrypted, either in the PLAYER 1000, in the TV 1020 or in another circuit interposed between the two (not shown). This exemplary embodiment illustrated one possible application—control of the authority and authentication to stream data such as a movie, not the format of the movie (irrespective of how encrypted or otherwise encoded).

Figure 11:
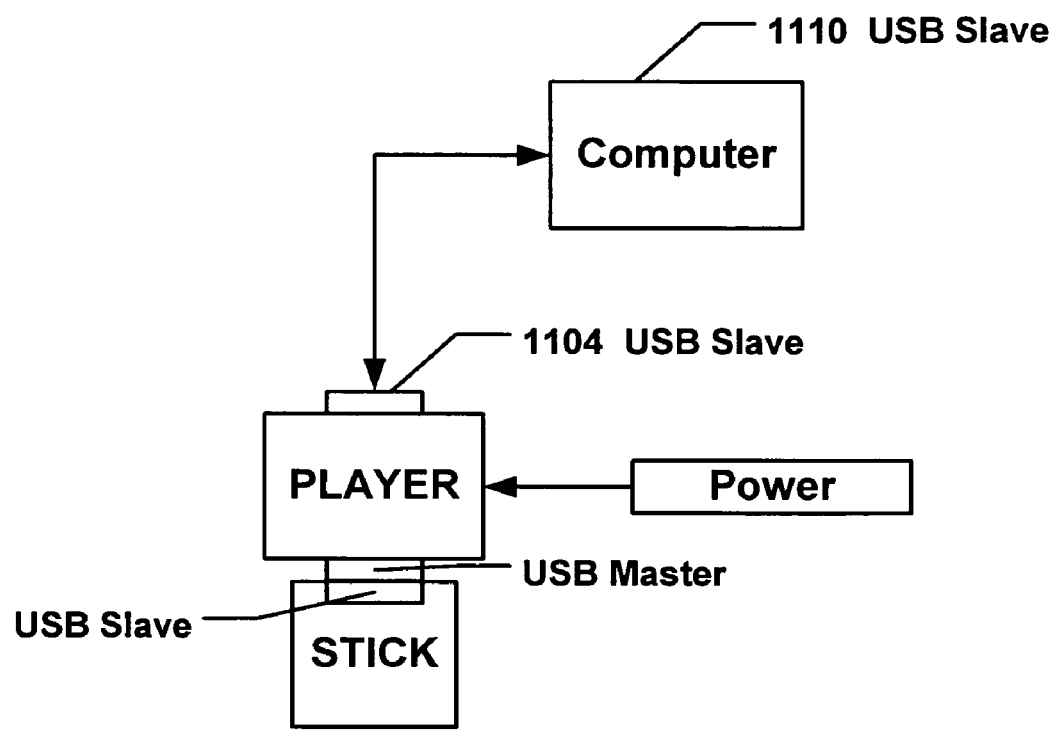
FIG. 11 shows a movie stick and player connected to a computer according to another embodiment of the invention.

Referring to FIG. 11 an alternative embodiment has the movie playing on a computer 1110 rather than a TV. As contrasted with FIG. 11, a USB Slave port has replaced the modulator. The Computer 1110 is presumed to include necessary equipment such as a USB Master port and a display (not shown in FIG. 11).

Figure 12:
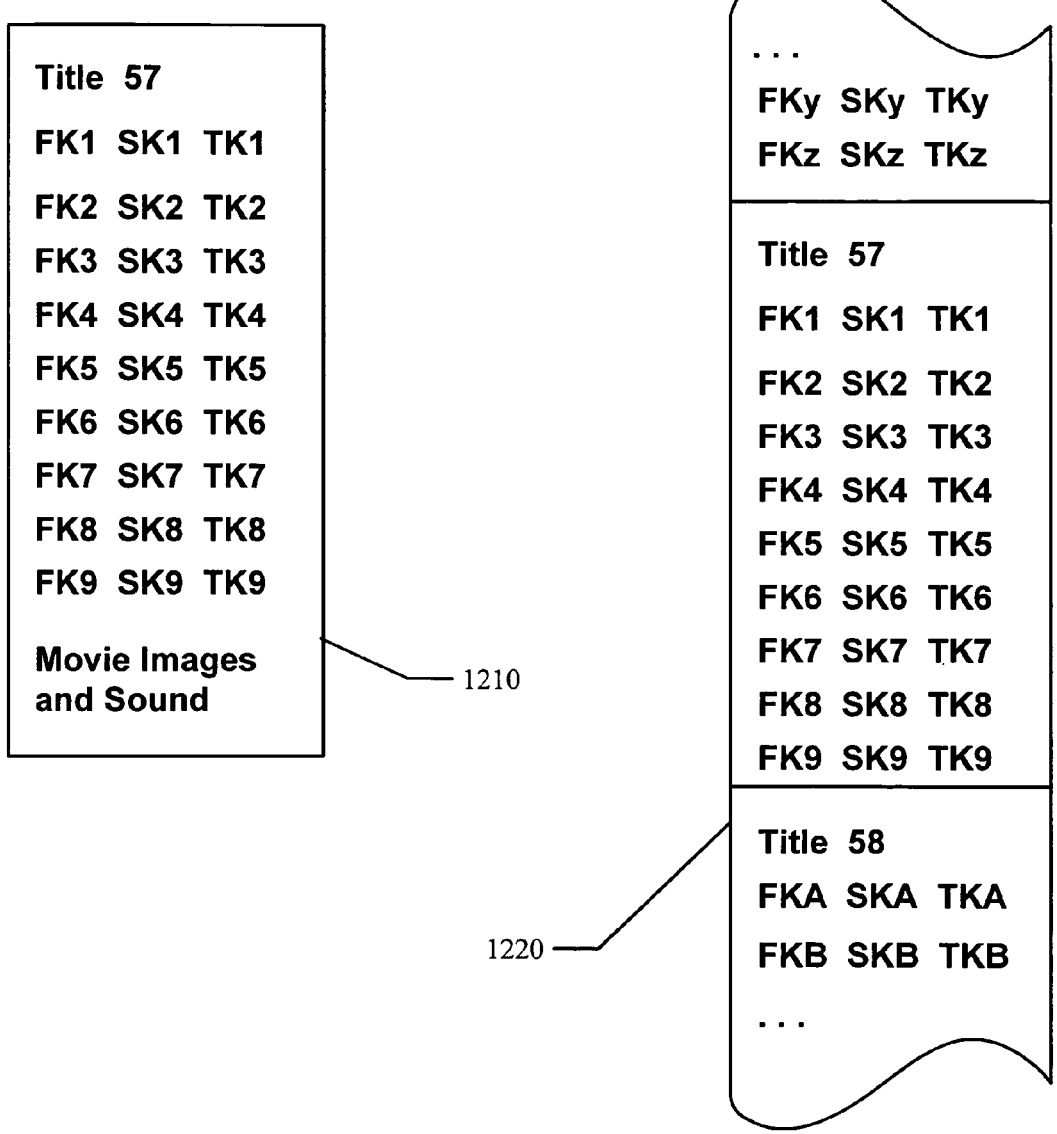
FIG. 12 shows sets of keys held in devices according to an embodiment of the invention.

Refer to FIG. 12. This shows some of the information 1210 encoded into a typical STICK and information 1220 encoded into a typical PLAYER. The STICK represents a movie stick for a particular title, in this case designated "Title 57" in any suitable digital encoding. Also digitally recorded into the STICK are the Movie's Images and Sound, which may or may not be encrypted.

Still referring to FIG. 12, in the STICK a 3 by 9 array of keys is encoded. These are a FK (first key), SK (second key) and TK (third key) for each of 9 sets. Fewer or greater than 9 sets may be provided. Keys may for example be 32 bit numbers chosen randomly prior to the manufacturing process.

Still referring to FIG. 12, in the PLAYER the same keys for Title 57 are recorded, but the keys for many other titles are also recorded, a little of Title 58 is shown by way of example. Since the PLAYER does not record movie images it may use comparable storage technology to store many keys, tens of millions perhaps in some applications. In all cases the keys may be secured using SOTOP circuits to make cracking and hacking difficult as described elsewhere.

Now follows an exemplary description of how the devices may be used to authenticate movie playing. A strength of the product that embodies the invention is based on the single-secure circuit concepts which effectively limit that the device can be cracked only by an eavesdropping approach (or an extremely expensive approach using sophisticated equipment). It is, by design, resistant to malware since there is no means to enter code or data into either device. Data may be erased only; code may neither be erased nor changed.

Figure 13:
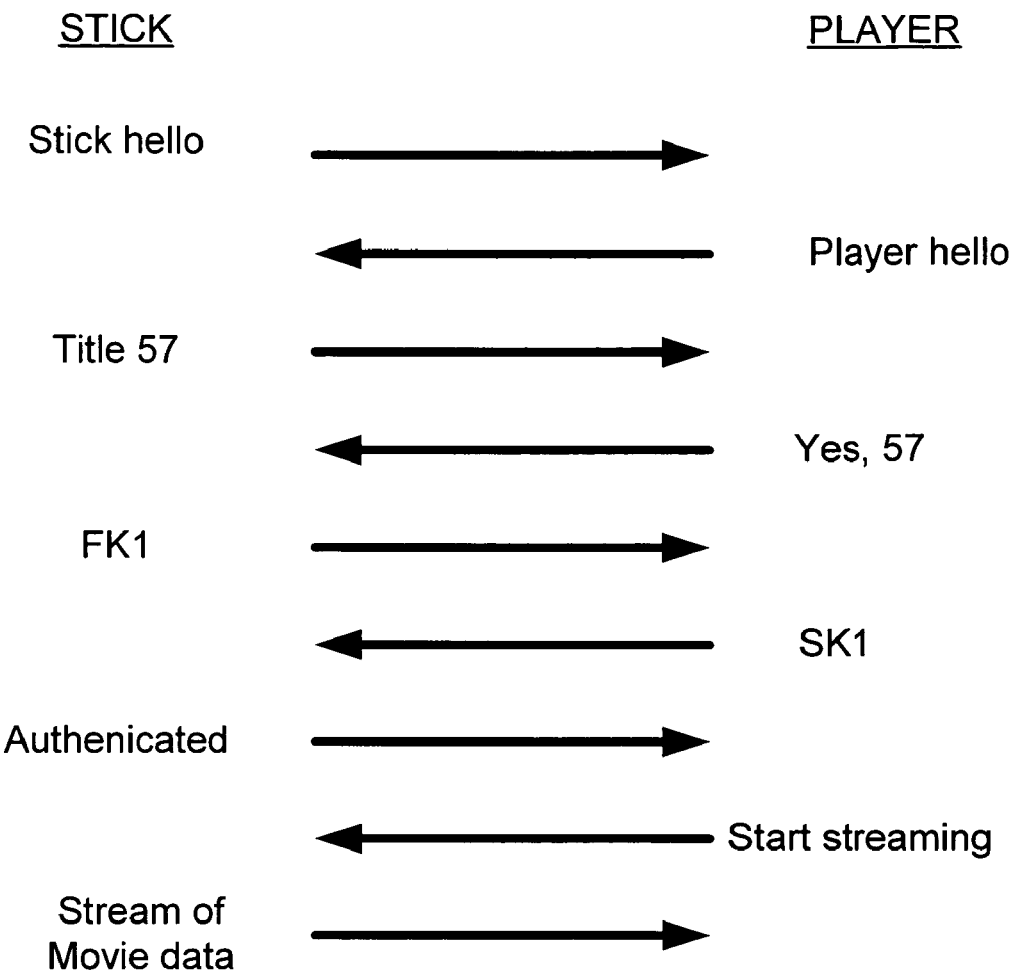
FIG. 13 shows simplest case of movie validation and playing according to an embodiment of the invention.

FIG. 13 shows a simple authentication and play process assuming that no keys have been revoked. The STICK "hello's" the PLAYER and then announces is has Title 57. The PLAYER confirms it "knows" of Title 57. The STICK sends FK1, which is the first key of set one. The PLAYER validates FK1 against its own key memory and imposes a delay if there is an error to hamper would-be hackers/crackers.

Assuming no error, the PLAYER having validated FK1 then sends the STICK SK1, which the stick checks against the STICK's memory. All being in order authentication is complete and playing may begin.

Figure 16:
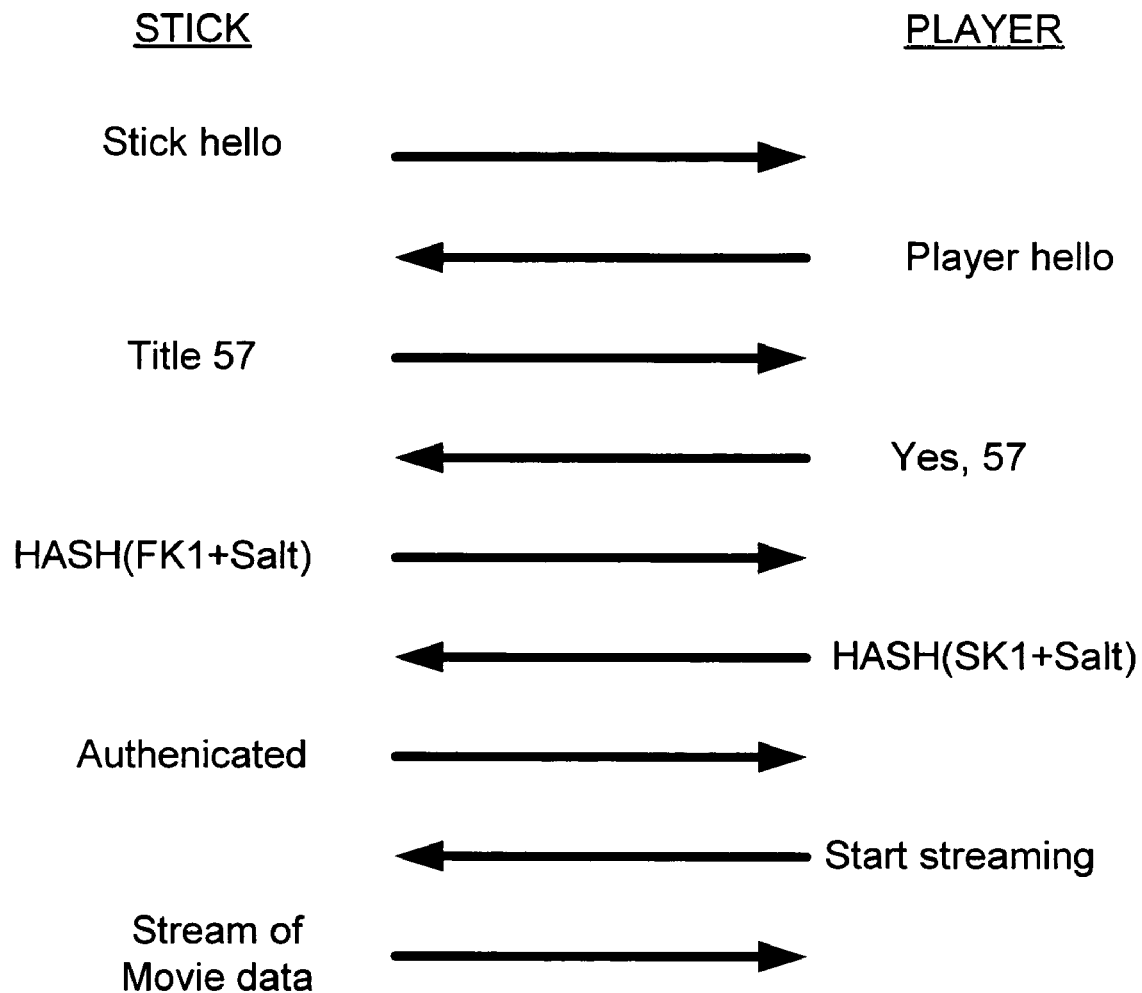
FIG. 16 shows a case of movie validation and playing using hashes according to an embodiment of the invention.

FIG. 16 shows HOW an alternative embodiment could exchange a cryptographically hashed message consisting of FK1 and a cryptographic salt. The salt could be a semi-random selection of bytes from TK1 or derived from data that is unique to the STICK or Title. In this case the player could run the same hashing algorithm on SK1 and a match of the result would authenticate the STICK. This would further frustrate eavesdropping attacks against the exchange.

Figure 17:
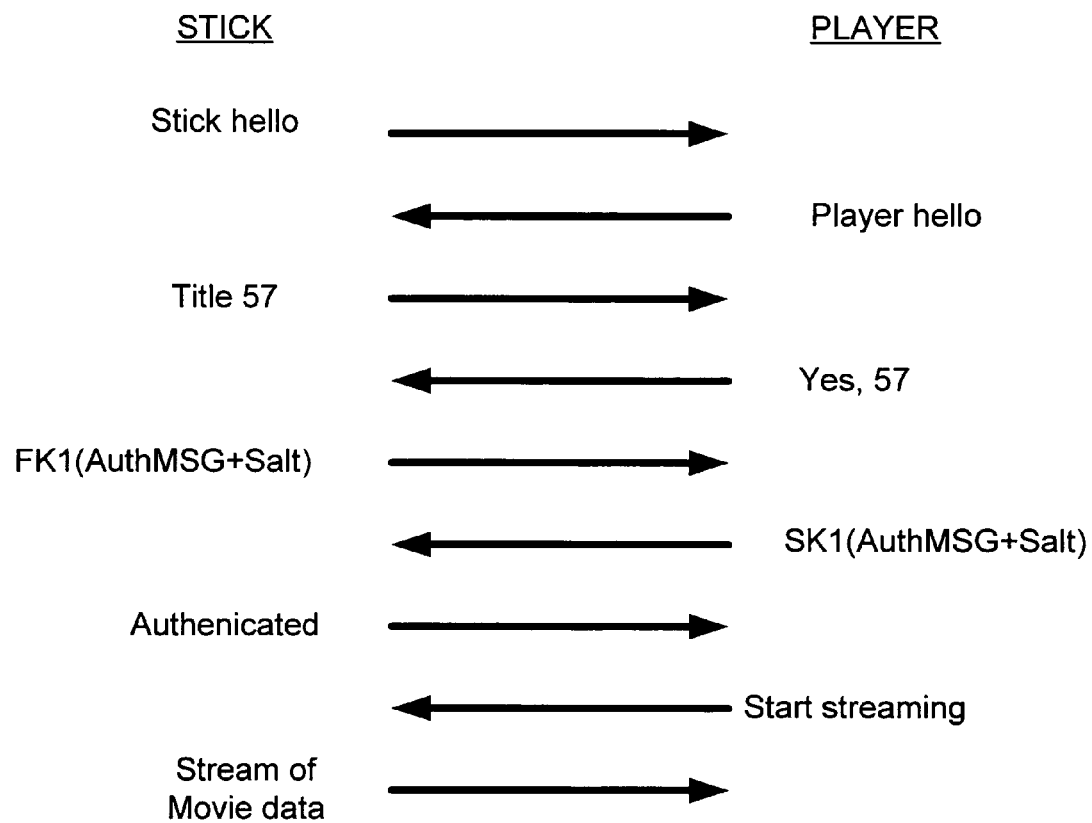
FIG. 17 shows a case of movie validation and playing using encryption according to an embodiment of the invention.

FIG. 17 shows HOW an alternative secure embodiment could exchange authentication messages encrypted with the keys from the STICK and the PLAYER. In this case after the STICK identifies itself as containing Title 57 the STICK sends the authentication request message combined with a salt encrypted with key FK1. The PLAYER decrypts the message with FK1 and if it gets a coherent authentication request the source is authenticated. The PLAYER then responds with an authentication request message combined with a salt that is encrypted with SK1 which the stick decrypts with SK1 and mutual authentication is complete.

Figure 14:
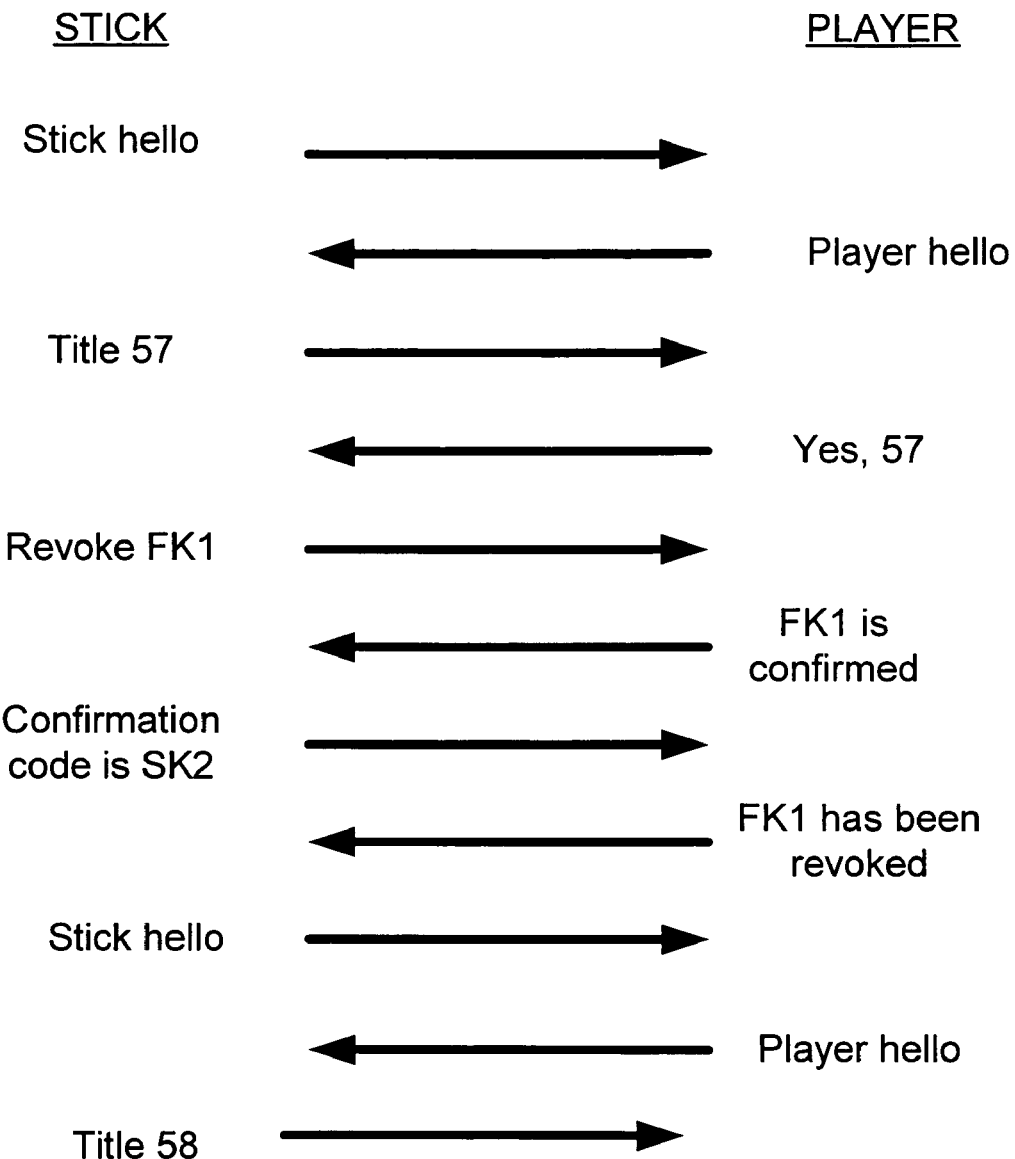
FIG. 14 shows process of key revocation according to an embodiment of the invention.
Figure 15:
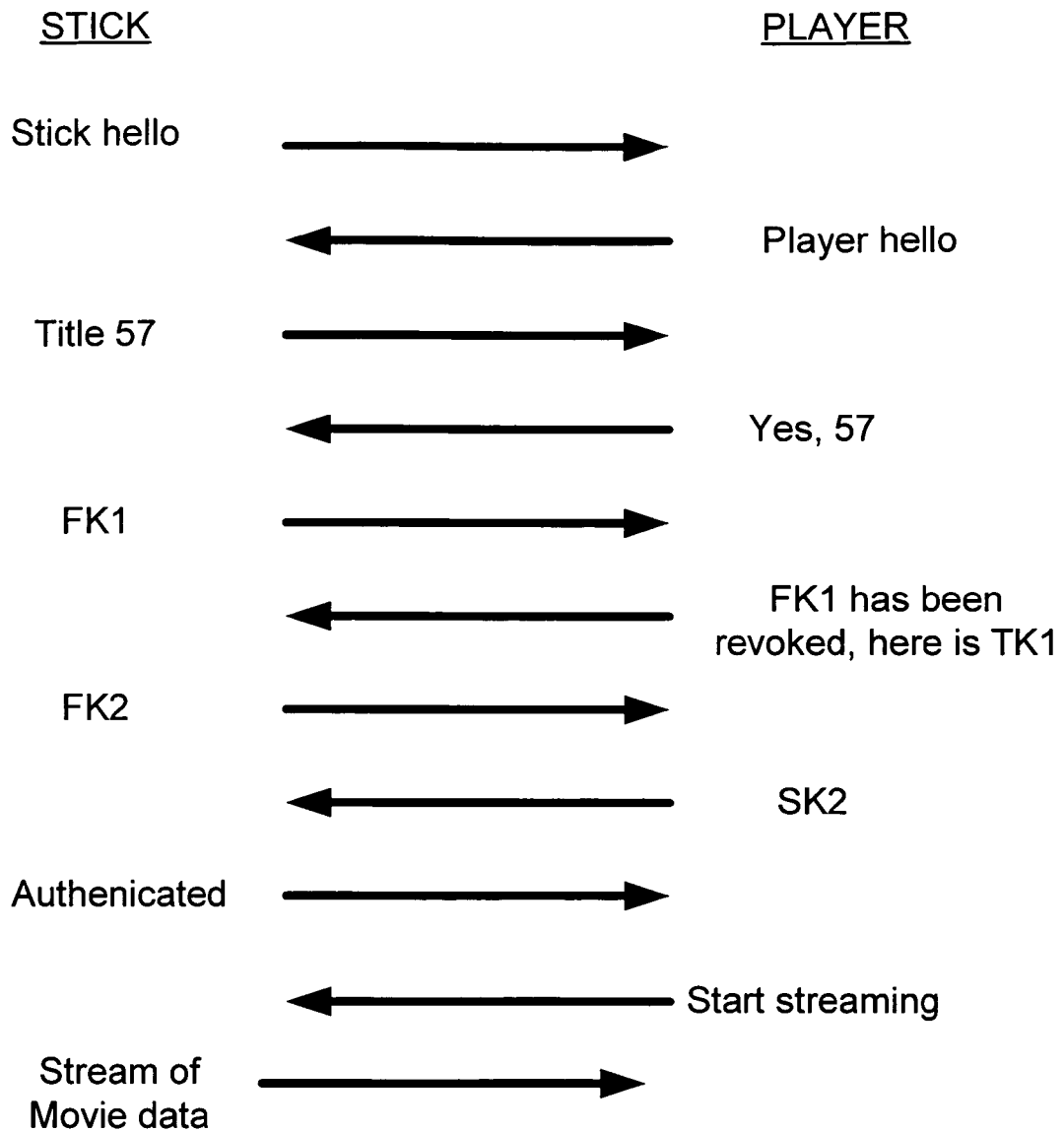
FIG. 15 shows an example process of movie validation after key revocation according to an embodiment of the invention.

FIG. 14 shows how a key may be revoked. In this example a new movie STICK (for title 58) is used to revoke FK1 of Title 57. The practical effect of doing this is to make any and all cracked or hacked titles unreliable and short lived.

Still referring to FIG. 14, after the initial hellos and announcement of Title 57, the STICK sends a message (command) to revoke FK1. The PLAYER confirms that it knows FK1, but it does not yet revoke FK1. First the STICK must prove its authority to revoke FK1, which it does by sending SK2 (not SK1). Note: this is the first time it is possible to eavesdrop on SK2. Thus, FK1 of Title 57 cannot be revoked until Title 58 is published. This puts control of the timing of "second generation" cracking of Title 57 in the hands of the distributor not the cracker. Thus cracking is made unprofitable.

After completion of the revocation of FK1 of Title 57, the movie STICK for Title 58 restarts the Hello sequence so it can stream Title 58 such as in the manner already described in connection with FIG. 4 for Title 57. Many minor (or major) variations to the protocol will be apparent to persons of ordinary skill in the art within the context of the invention.

FIG. 14 describes how the STICK for Title 57 may be authenticated and plays even after FK1 has been revoked. First the STICK offers FK1. But FK1 has been revoked in the PLAYER, so the PLAYER sends TK1 to the STICK. This code TK1 is checked by the STICK and authenticates that the PLAYER is genuine and therefore entitled (in effect) to demand the first key from the second set (FK2). FK2 is the authenticated in the PLAYER and SK2 is authenticated in the STICK and movie streaming can begin.

Thus, if fake devices are created by eavesdropping, several things make life hard for the malfeasants. First, it is not possible for a fake STICK to revoke FK1 until FK1 has been revoked legitimately because a prematurely created fake command does not know SK2 and the cracker has no means to find it.

Also, it is not possible to a fake PLAYER to tease FK2 out of the stick prematurely (before FK1 is legitimately revoked) because a hacker who creates a fake PLAYER cannot discover TK1 by eavesdropping until after FK1 is legitimately revoked.

Applying the hashing and encryption techniques from FIG. 16 and FIG. 17 to the revocation protocol will be apparent to persons of ordinary skill in the art within the context of the invention.

A business case could be constructed for example in which keys are revoked monthly so that cracked machines become somewhat incompatible and/or unreliable each month. Of course this does nothing to prevent eavesdropping of decrypted movies and the creation of entirely fake distribution systems since that involves the huge disadvantages of complexity embraced by other systems. But this embodiment of the invention does ensure that fake movie sticks will not play reliably in any genuine movie players that even occasionally play genuine movie sticks. And it further ensures that fake movie players will not reliably play genuine movie sticks.

The embodiments described above are exemplary rather than limiting and the scope and bounds of the present invention should be determined from the claims. Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A manufacture comprising:
  a first and a second clocked logic subsystem,
    each clocked logic subsystem comprising:
    a PGA (programmable gate array) circuit;
    a configurator circuit coupled to the PGA;
    a configuration memory coupled to the configurator circuit to steer the configurator circuit to configure the PGA and
    an input circuit coupled to write to the configuration memory wherein the input circuit of the first subsystem is operable to write to the configuration memory of the first subsystem during a first period of time in which the PGA of the first subsystem is not clocked and the PGA of the second subsystem is clocked.

2. The manufacture of claim 1 further wherein:
  the input circuit of the second subsystem is operable to write to the configuration memory of the second subsystem during a second period of time in which the PGA of the second subsystem is not clocked and the PGA of the first subsystem is clocked,
    wherein the first period of time and the second period of time are mutually exclusive.

3. The manufacture of claim 1 wherein:
  each clocked logic subsystem further comprises an output circuit coupled to the PGA wherein:
    the output circuit of the first subsystem is coupled to the input circuit of the second subsystem and
    the output circuit of the second subsystem is coupled to the input circuit of the first subsystem.

4. A secure circuit formed by closely coupling a first and a second insecure clocked logic subsystem wherein:
  the first insecure clocked logic subsystem is operable to write to the second insecure clocked logic subsystem during a first period in which a clock of the first insecure clocked logic subsystem is stopped and wherein the second insecure clocked logic subsystem is operable to write to the first insecure clocked logic subsystem during a second period that a clock of the insecure clocked logic second subsystem is stopped.

5. The secure circuit of claim 4 wherein:
  the secure circuit is operable to perform as a SOTOP (Single Secure One-Time Only Programmable) memory.

6. The secure circuit of claim 4 wherein:
  the secure circuit is operable to perform as a SCSM (Single Circuit Secure Memory).

7. The manufacture of claim 1 further wherein:
  each configuration memory is a NVCM (non-volatile configuration memory).

8. The manufacture of claim 7 further wherein:
  each PGA is coupled to a RAM (read-write memory) and the configurator is operable to configure and initialize the PGA and to initialize a plurality of data in the RAM responsive to the contents of the NVCM.

9. The manufacture of claim 8 further wherein:
  each PGA is operable to transfer a subset of the plurality of data from the RAM of the first subsystem to the NVCM of the second subsystem.

* * * * *